United States Patent
Liang et al.

(10) Patent No.: US 12,010,088 B2
(45) Date of Patent: Jun. 11, 2024

(54) DATA SENDING METHOD AND APPARATUS, AND METHOD AND SYSTEM FOR ESTABLISHING P2P CONNECTION

(71) Applicant: SHANGHAI BILIBILI TECHNOLOGY CO., LTD., Shanghai (CN)

(72) Inventors: Shunli Liang, Shanghai (CN); Hanchao Zheng, Shanghai (CN); Honglei Cui, Shanghai (CN); Hao Wang, Shanghai (CN); Biao Hu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/271,024

(22) PCT Filed: Jan. 5, 2022

(86) PCT No.: PCT/CN2022/070246
§ 371 (c)(1),
(2) Date: Jul. 5, 2023

(87) PCT Pub. No.: WO2022/148364
PCT Pub. Date: Jul. 14, 2022

(65) Prior Publication Data
US 2024/0064124 A1 Feb. 22, 2024

(30) Foreign Application Priority Data

Jan. 6, 2021 (CN) .......................... 202110011585.7

(51) Int. Cl.
*H04L 61/2517* (2022.01)
*H04L 101/695* (2022.01)

(52) U.S. Cl.
CPC .... *H04L 61/2517* (2013.01); *H04L 2101/695* (2022.05)

(58) Field of Classification Search
CPC ............. H04L 61/2517; H04L 61/2578; H04L 13/0811; H04L 61/2575; H04L 61/2564
See application file for complete search history.

(56) References Cited

U.S. PATENT DOCUMENTS 6,029,194 A * 2/2000 Tilt ........................ H04L 65/612
725/116
9,497,160 B1 11/2016 Diffie et al.
(Continued)

FOREIGN PATENT DOCUMENTS

CN 102710807 A 10/2012
CN 105580334 A 5/2016
(Continued)

OTHER PUBLICATIONS

Khan et al., "An Extensive Study on Application Level Gateways (ALGs)", IEEE 14th international Multitopic Conference, Dec. 2011, IEEE Publishing.*
(Continued)

*Primary Examiner* — Todd L Barker
(74) *Attorney, Agent, or Firm* — BakerHostetler

(57) ABSTRACT

This application provides techniques comprising S1: establishing a queue for accommodating m file descriptors for creating $n_1$ first access request data packets; S2: creating an $i^{th}$ file descriptor in the queue, sending an $i^{th}$ first access request data packet by using the $i^{th}$ file descriptor, and monitoring a source port recorded by the $i^{th}$ file descriptor; S3: at every first preset time interval $t_1$, enabling i to automatically increase by 1, continuing to perform operation S2, and setting preset monitoring time T for each source port, where $T=t_1*m$; and S4: ending monitoring of an $(i-m)^{th}$ source port and destroying a corresponding file
(Continued)

descriptor while creating an $i^{th}$ file descriptor in the queue when $m*j<i\leq m*(j+1)$, and stopping monitoring of other source ports in response to detecting that a first port receives a response data packet, where the first port is any source port in a monitored state.

20 Claims, 6 Drawing Sheets

(56) References Cited

U.S. PATENT DOCUMENTS

| | | | |
|---|---|---|---|
| 11,140,053 B2* | 10/2021 | Takeda | H04L 43/0811 |
| 2011/0035259 A1* | 2/2011 | Das | G06Q 30/0275 |
| | | | 705/14.71 |
| 2015/0281171 A1 | 10/2015 | Xiao | |
| 2016/0080402 A1* | 3/2016 | Smith | H04W 80/06 |
| | | | 726/23 |
| 2020/0089527 A1* | 3/2020 | Gavrilov | G06F 9/546 |
| 2021/0103937 A1* | 4/2021 | Joglekar | G06Q 40/02 |
| 2022/0053027 A1* | 2/2022 | Weiss | H04L 63/20 |
| 2022/0103525 A1* | 3/2022 | Shribman | G06F 16/955 |

FOREIGN PATENT DOCUMENTS

| | | |
|---|---|---|
| CN | 109600449 A | 4/2019 |
| CN | 109962987 A | 7/2019 |
| CN | 112134826 A | 12/2020 |
| CN | 112637382 A | 4/2021 |

OTHER PUBLICATIONS

Huang et al., "The P2P Solution Research and Design Based on NAT Traversing Technology" IEEE 3rd Advanced Information Management, Communicates, Electronic and Automation Control Conference, Oct. 11, 2019, IEEE Publishing.*

Srirama et al., "TCP Hole Punching Approach to Address Devices in Mobile Networks", International Conference on Future Internet of Things and Cloud, Aug. 27, 2014, IEEE Publishing.*

International Patent Application No. PCT/CN2022/070246; Int'l Search Report; dated Mar. 16, 2022; 2 pages.

* cited by examiner

DATA SENDING METHOD AND APPARATUS, AND METHOD AND SYSTEM FOR ESTABLISHING P2P CONNECTION

CROSS-REFERENCE TO RELATED APPLICATION

This application is the U.S. National Stage of International Application No. PCT/CN2022/070246, filed on Jan. 5, 2022, which claims priority to Chinese Patent Application No. 202110011585.7, filed on Jan. 6, 2021, and entitled "DATA SENDING METHOD AND APPARATUS AND P2P CONNECTION ESTABLISHMENT METHOD AND SYSTEM", both of which are incorporated herein by reference in their entireties.

TECHNICAL FIELD

This application relates to the field of communication technologies, and in particular, to a data sending method. This application also relates to a data sending apparatus, a P2P connection establishment method and system, a computing device, and a computer-readable storage medium.

BACKGROUND

A NAT technology is a technology for translating a private IP address of an internal network into a public IP address of an external network. The technology enables multiple hosts in a specific range to be connected to an external network by using only one public IP address. In the NAT technology, although a problem of IPv4 address shortage is resolved to some extent, peer to peer (P2P) network communication is broken. A main reason is that NAT does not allow an external network host to actively access an internal network host. There are four NAT types: full-cone, restricted-cone, port-restricted, and symmetric. There are 10 types of combinations in total. There is still no good hole punching solution for two types of combinations: port-restricted-symmetric and symmetric-symmetric. If one party is symmetric NAT, a router maps the party to different addresses and ports based on different destination addresses. Only when a host has sent a data packet to an external host (IP_x, Port_x), can a data packet from the external host (IP_x, Port_x) be received by a symmetric NAT router.

Therefore, it is necessary to provide a hole punching solution for port-restricted-symmetric.

SUMMARY

In view of this, embodiments of this application provide a data sending method. This application also relates to a data sending apparatus, a P2P connection establishment method and system, a computing device, and a computer-readable storage medium, to resolve hole punching between port-restricted NAT and symmetric NAT in an existing technology by using a relatively small quantity of file descriptors.

According to a first aspect of the embodiments of this application, a data sending method is provided. The method is applied to a terminal device in symmetric NAT and includes:

S1: establishing, for $n_1$ first access request data packets, a queue for accommodating m file descriptors, where $2 \leq m < n_1$;

S2: creating an $i^{th}$ file descriptor in the queue, sending an $i^{th}$ first access request data packet by using the $i^{th}$ file descriptor, and monitoring a source port recorded by the $i^{th}$ file descriptor, where the $i^{th}$ file descriptor has a same source port as the $i^{th}$ first access request data packet, and $1 \leq i \leq n_1$;

S3: every first preset time interval $t_1$, enabling i to automatically increase by 1, continuing to perform step S2, and setting preset monitoring time T for each source port, where each file descriptor records a different source port, and $T = t_1 * m$; and S4: if $m*j < i \leq m*(j+1)$, when creating an $i^{th}$ file descriptor in the queue, ending monitoring of an $(i-m)^{th}$ source port and destroying a corresponding file descriptor, and stopping monitoring of other source ports when it is detected that a first port receives a response data packet, where $j \geq 1$, and the first port is any source port in a monitored state.

Optionally, the data sending method further includes: if still receiving no response data packet when preset monitoring time T of a source port recorded by an $(n_1)^{th}$ file descriptor ends, performing, again, the step of establishing, for $n_1$ first access request data packets, a queue for accommodating m file descriptors.

Optionally, the data sending method further includes: sending first to-be-transmitted data and/or receiving second to-be-transmitted data by using the first port.

Optionally, the stopping monitoring of other source ports when it is detected that a first port receives a response data packet includes:

when detecting that the first port receives the response data packet, destroying file descriptors corresponding to the other source ports.

Optionally, before the establishing, for $n_1$ first access request data packets, a queue for accommodating m file descriptors, the data sending method further includes:

sending an information obtaining request to a traversal auxiliary server;

receiving address information and a NAT type of the terminal device that are sent by the traversal auxiliary server;

sending the received address information and NAT type to an access management server; and receiving address information and a NAT type of a to-be-accessed end that are fed back by the access management server.

Optionally, before the sending an $i^{th}$ first access request data packet by using the $i^{th}$ file descriptor, the data sending method further includes:

generating the $i^{th}$ first access request data packet based on the received address information of the to-be-accessed end and the source port corresponding to the $i^{th}$ file descriptor.

According to a second aspect of the embodiments of this application, a P2P connection establishment method is provided, including:

a first terminal device sends $n_2$ second access request data packets at a second preset time interval $t_2$ by using one file descriptor, where the first terminal device is in port-restricted NAT, and the $n_2$ second access request data packets have a same destination IP address and different destination ports;

a second terminal device that is in symmetric NAT and that corresponds to the destination IP address performs the following operations:

S1: establishing, for $n_1$ first access request data packets, a queue for accommodating m file descriptors, where $2 \leq m < n_1$;

S2: creating an $i^{th}$ file descriptor in the queue, sending an $i^{th}$ first access request data packet by using the $i^{th}$ file descriptor, and monitoring a source port recorded by the $i^{th}$ file descriptor, where the $i^{th}$ file descriptor has a same source port as the $i^{th}$ first access request data packet, and $1 \le i \le n_1$;

S3: every first preset time interval $t_1$, enabling i to automatically increase by 1, continuing to perform step S2, and setting preset monitoring time T for each source port, where each file descriptor records a different source port, and $T=t_1*m$; and S4: if $m*j<i \le m*(j+1)$, when creating an $i^{th}$ file descriptor in the queue, ending monitoring of an $(i-m)^{th}$ source port and destroying a corresponding file descriptor;

within a $t_2*n_2+t_1*n_1$ monitoring time period of a source port of the first terminal device, if the port-restricted NAT detects that the source port of the first terminal device receives a first access request data packet from the second terminal device, the first terminal device obtains address information in the first access request data packet, and sends a response data packet based on the obtained address information; and when detecting that a first port of the second terminal device receives the response data packet, the symmetric NAT stops monitoring of other source ports, where the first port corresponds to the obtained address information.

Optionally, the P2P connection establishment method further includes:

if still receiving no response data packet when preset monitoring time T of a source port recorded by an $(n_1)^{th}$ file descriptor ends, performing, again under a preset condition, the step of sending, by the first terminal device, $n_2$ second access request data packets at a second preset time interval $t_2$ by using one file descriptor.

Optionally, before the sending, by the first terminal device, $n_2$ second access request data packets at a second preset time interval $t_2$ by using one file descriptor, the P2P connection establishment method further includes:

the first terminal device and the second terminal device separately send information obtaining requests to a traversal auxiliary server;

the first terminal device and the second terminal device separately receive respective address information and NAT types that are sent by the traversal auxiliary server;

the first terminal device and the second terminal device send the received respective address information and NAT types to an access management server; and the first terminal device receives address information and a NAT type of the second terminal device that are fed back by the access management server, and the second terminal device receives address information and a NAT type of the first terminal device that are fed back by the access management server.

Optionally, before the sending, by the first terminal device, $n_2$ second access request data packets at a second preset time interval $t_2$ by using one file descriptor, the P2P connection establishment method further includes:

setting an initial port of the second terminal device to a random number, and setting destination ports with a same interval between port numbers for the $n_2$ second access request data packets; and generating the second access request data packets based on an IP address in the received address information of the second terminal device, the set destination ports, and a source port corresponding to the file descriptor.

Optionally, the setting an initial port of the second terminal device to a random number, and setting destination ports with a same interval between port numbers for the $n_2$ second access request data packets includes:

setting the initial port of the second terminal device to a sum of a random number related to $n_2$ and a preset value; and setting an interval between a destination port of each second access request data packet and a destination port of a previous second access request data packet to a fixed value related to the preset value.

Optionally, when the first terminal device sends the $n_2$ second access request data packets, first mapping relationships between address information of the first terminal device and address information of the second terminal device are established; when the second terminal device sends the $n_1$ first access request data packets, second mapping relationships between address information of the second terminal device and address information of the first terminal device are established; and the detecting that the source port of the first terminal device receives a first access request data packet from the second terminal device includes:

comparing the first mapping relationships with the second mapping relationships, and if there are matching mapping relationships, detecting that the source port of the first terminal device receives the first access request data packet from the second terminal device.

Optionally, the P2P connection establishment method further includes:

the second terminal device sends, by using the first port, first to-be-transmitted data to a source port corresponding to the file descriptor of the first terminal device; and/or the first terminal device sends second to-be-transmitted data to the first port by using the source port corresponding to the file descriptor of the first terminal device.

Optionally, $n_1=n_2$ and $t_1=t_2$.

Optionally, the first access request data packet and the second access request data packet include UDP packets.

According to a third aspect of the embodiments of this application, a data sending apparatus is provided. The apparatus is applied to a terminal device in symmetric NAT and includes:

an establishment module, configured to perform step S1: establishing, for $n_1$ first access request data packets, a queue for accommodating m file descriptors, where $2 \le m < n_1$;

a creation and sending module, configured to perform step S2: creating an $i^{th}$ file descriptor in the queue, sending an $i^{th}$ first access request data packet by using the $i^{th}$ file descriptor, and monitoring a source port recorded by the $i^{th}$ file descriptor, where the $i^{th}$ file descriptor has a same source port as the $i^{th}$ first access request data packet, and $1 \le i \le n_1$;

a setting module, configured to perform step S3: every first preset time interval $t_1$, enabling i to automatically increase by 1, continuing to perform step S2, and setting preset monitoring time T for each source port, where each file descriptor records a different source port, and $T=t_1*m$; and a monitoring stopping module, configured to perform step S4: if $m*j<i \le m*(j+1)$, when creating an $i^{th}$ file descriptor in the queue, ending monitoring of an $(i-m)^{th}$ source port and destroying a corresponding file descriptor, and stopping monitoring of other source ports when it is detected that a first port receives a response data packet, where $j≥1$, and the first port is any source port in a monitored state.

According to a fourth aspect of the embodiments of this application, a P2P connection establishment system is provided, including port-restricted NAT, a first terminal device in the port-restricted NAT, symmetric NAT, and a second terminal device in the symmetric NAT.

The first terminal device is configured to send $n_2$ second access request data packets at a second preset time interval $t_2$ by using one file descriptor, where the $n_2$ second access request data packets have a same destination IP address and different destination ports.

The second terminal device corresponds to the destination IP address, and the second terminal device is configured to perform the following steps:

S1: establishing, for $n_1$ first access request data packets, a queue for accommodating m file descriptors, where $2≤m<n_1$;

S2: creating an $i^{th}$ file descriptor in the queue, sending an $i^{th}$ first access request data packet by using the $i^{th}$ file descriptor, and monitoring a source port recorded by the $i^{th}$ file descriptor, where the $i^{th}$ file descriptor has a same source port as the $i^{th}$ first access request data packet, and $1≤i≤n_1$;

S3: every first preset time interval $t_1$, enabling i to automatically increase by 1, continuing to perform step S2, and setting preset monitoring time T for each source port, where each file descriptor records a different source port, and $T=t_1*m$; and S4: if $m*j<i≤m*(j+1)$, when creating an $i^{th}$ file descriptor in the queue, ending monitoring of an $(i-m)^{th}$ source port and destroying a corresponding file descriptor.

The first terminal device is configured to: within a $t_2*n_2+t_1*n_1$ monitoring time period of a source port of the first terminal device, if the port-restricted NAT detects that the source port of the first terminal device receives a first access request data packet from the second terminal device, obtain address information in the first access request data packet, and send a response data packet based on the obtained address information.

The symmetric NAT is configured to: when detecting that a first port of the second terminal device receives the response data packet, stop monitoring of other source ports, where the first port corresponds to the obtained address information.

According to a fifth aspect of the embodiments of this application, a computing device is provided, including a memory, a processor, and computer instructions that are stored in the memory and that can be run on the processor, where the processor implements the steps of the data sending method when executing the computer instructions.

According to a sixth aspect of the embodiments of this application, a computer-readable storage medium is provided, storing computer instructions, where the steps of the data sending method are implemented when the computer instructions are executed by a processor.

According to the data sending method provided in this application, the terminal device in the symmetric NAT uses the queue for accommodating m file descriptors, and sets proper monitoring time for each file descriptor, so that a relatively large quantity of data packets are sent on a terminal device side by using only m file descriptors. Therefore, a relatively high connection establishment success rate is provided by using a relatively small quantity of file descriptors, and file descriptor utilization can be improved due to occupation of a relatively small quantity of file descriptors, thereby saving a common resource, and implementing a same function by using as few file descriptors as possible.

DESCRIPTION OF EMBODIMENTS

In the following description, numerous specific details are set forth to facilitate full understanding of this application. However, this application can be implemented in many other manners different from those described herein. A person skilled in the art can make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "the", and "this" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that, although terms such as "first" and "second" may be used in one or more embodiments of this application to describe various types of information, the information should not be limited to these terms. These terms are merely used to distinguish between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

This application provides a data sending method. This application also relates to a data sending apparatus, a P2P connection establishment method, a P2P connection establishment system, a computing device, and a computer-readable storage medium, which are described in detail one by one in the following embodiments.

Figure 1:
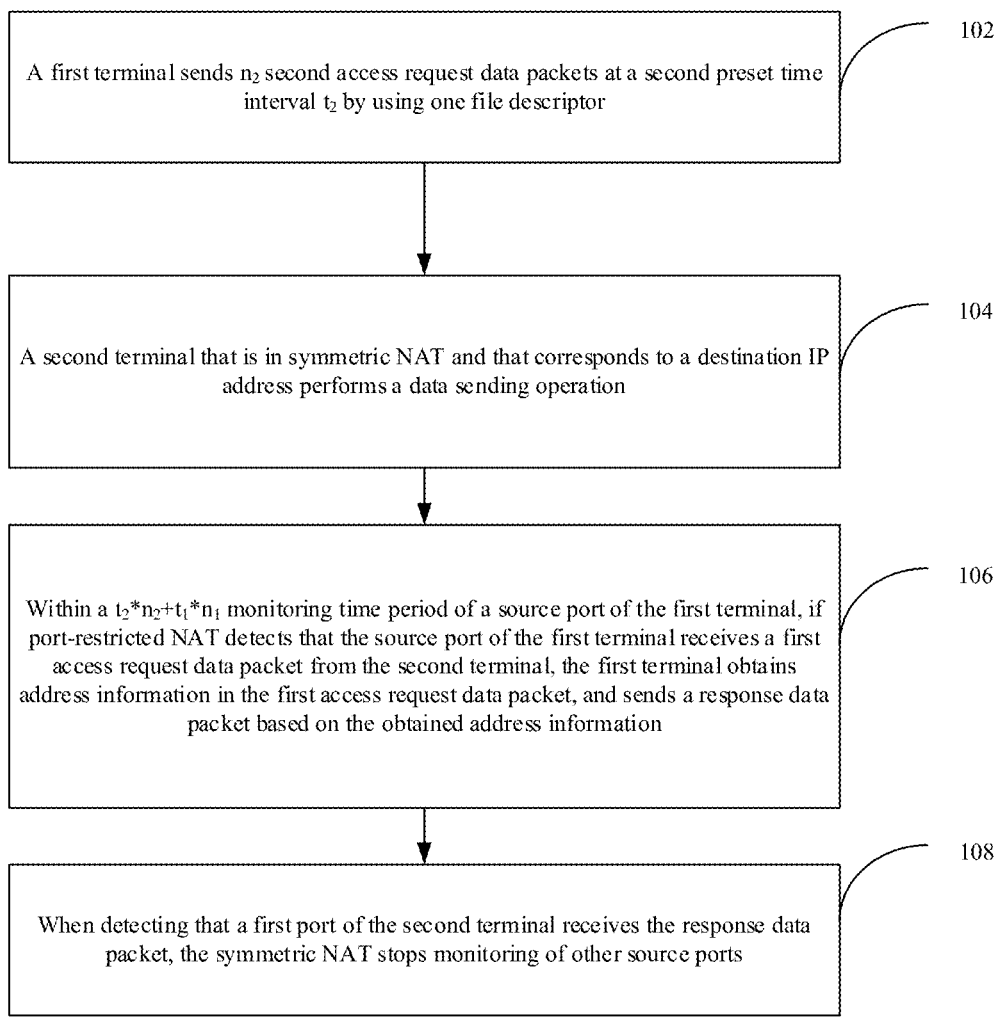
FIG. 1 is a flowchart of a P2P connection establishment method according to an embodiment of this application.

FIG. 1 is a flowchart of a P2P connection establishment method according to an embodiment of this application. The P2P connection establishment method specifically includes the following steps:

Step 102: A first terminal device sends $n_2$ second access request data packets at a second preset time interval $t_2$ by using one file descriptor, where the first terminal device is in port-restricted NAT, and the $n_2$ second access request data packets have a same destination IP address and different destination ports.

Before this step, the first terminal device and a second terminal device in symmetric NAT separately send information obtaining requests to a traversal auxiliary server; the traversal auxiliary server sends respective address information and NAT types of the first terminal device and the second terminal device to the first terminal device and the second terminal device; the first terminal device and the second terminal device send the received respective address information and NAT types to an access management server; and the access management server feeds back address information and a NAT type of the second terminal device to the first terminal device, and feeds back address information and a NAT type of the first terminal device to the second terminal device. The address information includes 4-tuples of external IPs, external ports, internal IPs, and internal ports, namely, (IP-A, Port-A, IP-natA, Port-natA) and (IP-B, Port-B, IP-natB, Port-natB), of the first terminal device and the second terminal device. The traversal auxiliary server is a server such as a STUN server. The access management server is a server such as a tracker server. The access management server sends, to each terminal device based on a same request resource ID, node information for playing a same resource, and the first terminal device and the second terminal device each obtain an internal network and public network address 4-tuple and a NAT type of a peer end.

After the first terminal device obtains an internal network and public network address 4-tuple and a NAT type of the second terminal device, the first terminal device sends the second access request data packets at the second preset time interval $t_2$ by using a same source port and by using a file descriptor for previously establishing a connection to the traversal auxiliary server. The second access request data packet may be a UDP packet or a TCP packet. In an embodiment, the UDP packet is used, to achieve better real-time performance. Destination IP addresses in the $n_2$ second access request data packets are the same, and are all an external network IP address of the second terminal device, and destination ports of all the second access request data packets are different, where $n_2$ may be determined based on experience, and is a predetermined value in a specific range.

In an optional embodiment, the destination ports of all the second access request data packets are enabled to be different by using the following implementation:

setting an initial port of the second terminal device to a random number, and setting destination ports with a same interval between port numbers for the $n_2$ second access request data packets; and generating the second access request data packets based on an IP address in the received address information of the second terminal device, the set destination ports, and a source port corresponding to the file descriptor.

There is a same interval between destination port numbers of every two consecutively sent second access request data packets.

In an optional embodiment, the setting an initial port of the second terminal device to a random number, and setting destination ports with a same interval between port numbers for the $n_2$ second access request data packets may be implemented by using the following method:

setting the initial port of the second terminal device to a sum of a random number related to $n_2$ and a preset value; and setting an interval between a destination port of each second access request data packet and a destination port of a previous second access request data packet to a fixed value related to the preset value.

For example, if ports 0 to 1023 are ports of an inherent protocol, the preset value may be set to 1024. In this case, these ports are not allocated during automatic allocation, thereby improving a hole punching success rate. Specifically, for example, the initial port is set to $$\text{Port} = |rand()|\% \frac{(65535 - 1024)}{n_2} + 1024,$$

and the interval between the destination port of each second access request data packet and the destination port of the previous second access request data packet is set to $$\frac{(65535 - 1024)}{n_2}.$$

The destination port interval is set to the value, so that the ports can be spaced apart. Therefore, matching degrees between second terminal device mapping relationships and the destination ports are improved, thereby improving a P2P connection establishment success rate. Different initial ports are allocated, and there is a same distance between each following port and a previous port, to prevent mapping information that is left in the port-restricted NAT of the first terminal device when the first terminal device previously established a connection to the second terminal device from being overwritten when the first terminal device establishes a connection to a third terminal device or establishes connections to more other terminal devices, so that connections established between terminal devices are independent of each other, thereby effectively improving a connection establishment success rate.

The first terminal device establishes a second access request data packet by using the file descriptor, where a destination IP address is the external network IP address of the second terminal device, a destination port is the set initial port, and a quantity of sending times of the second access request data packet is denoted as count1=1. After the second preset time interval, the first terminal device establishes a second access request data packet by using the same file descriptor, where the destination IP address remains unchanged, the destination port changes to $$\text{Port} + \frac{(65535 - 1024)}{n_2},$$

and the quantity of sending times of the second access request data packet is count1=count1+1. The first terminal device performs the foregoing operation every second preset time interval, and stops sending the second access request data packet when the quantity of sending times of the second access request data packet is $n_2$.

Although all the second access request data packets are discarded by the symmetric NAT of the second terminal device, mapping relationships based on which data packet requests from $n_2$ different ports of the symmetric NAT of the second terminal device can be received are established in the port-restricted NAT of the first terminal device. Subsequently, provided that a data packet from the symmetric NAT of the second terminal device belongs to one of the $n_2$ mapping relationships, hole punching can succeed.

Step 104: The second terminal device that is in the symmetric NAT and that corresponds to the destination IP address performs a data sending operation.

The data sending operation includes:

S1: establishing, for $n_1$ first access request data packets, a queue for accommodating m file descriptors, where $2 \leq m < n_1$;

S2: creating an $i^{th}$ file descriptor in the queue, sending an $i^{th}$ first access request data packet by using the $i^{th}$ file descriptor, and monitoring a source port recorded by the $i^{th}$ file descriptor, where the $i^{th}$ file descriptor has a same source port as the $i^{th}$ first access request data packet, and $1 \leq i \leq n_1$;

S3: every first preset time interval $t_1$, enabling i to automatically increase by 1, continuing to perform step S2, and setting preset monitoring time T for each source port, where each file descriptor records a different source port, and $T = t_1 * m$, where after the first preset time interval $t_1$ after the $i^{th}$ file descriptor is created, an $(i+1)^{th}$ file descriptor is created in the queue, an $(i+1)^{th}$ first access request data packet is sent by using the $(i+1)^{th}$ file descriptor, and a source port recorded by the $(i+1)^{th}$ file descriptor is monitored, where the $(i+1)^{th}$ file descriptor has a same source port as the $(i+1)^{th}$ first access request data packet; after the first preset time interval $t_1$ after the $(i+1)^{th}$ file descriptor is created, an $(i+2)^{th}$ file descriptor is created in the queue, an $(i+2)^{th}$ first access request data packet is sent by using the $(i+2)^{th}$ file descriptor, and a source port recorded by the $(i+2)^{th}$ file descriptor is monitored, where the $(i+2)$ t file descriptor has a same source port as the $(i+2)^{th}$ first access request data packet; and so on, where i is enabled to automatically increase by 1, and after i automatically increases by 1 each time, a corresponding file descriptor is created and a first access request data packet is sent based on the file descriptor, and then a next step is performed; and S4: if $m*j < i \leq m*(j+1)$, when creating an $i^{th}$ file descriptor in the queue, ending monitoring of an $(i-m)^{th}$ source port and destroying a corresponding file descriptor.

After waiting for a $t_2*n_2$ time period, the second terminal device initializes an empty queue that can accommodate m file descriptors, creates the first file descriptor and adds the first file descriptor to the queue, establishes a first access request data packet whose destination address is an external network IP address and the port of the first terminal device, and sends the first access request data packet by using the file descriptor. The file descriptor has a same source port as the first access request data packet. After the first preset time interval $t_1$, the second terminal device creates the second file descriptor and adds the second file descriptor to the queue, establishes a first access request data packet whose destination address is the IP address and the port of the first terminal device, and sends the first access request data packet by using the second file descriptor. The file descriptor has a same source port as the first access request data packet, a source port is a sending port corresponding to an unused port number automatically allocated by a system, and the preset monitoring time $T = t_1 * m$ is set for each file descriptor. After the first preset time interval $t_1$ after an $m^{th}$ file descriptor is created and a first access request data packet is sent by using the file descriptor, an $(m+1)^{th}$ file descriptor is created.

Because monitoring time of the first file descriptor in the queue ends, monitoring of the first source port corresponding to the first file descriptor is ended and the first file descriptor is destroyed, and the newly created $(m+1)^{th}$ file descriptor is added to the queue. The foregoing steps are repeated until $n_1$ file descriptors are created. $n_1$ may be the same as or different from $n_2$, and the first preset time interval $t_1$ may be the same as or different from the second preset time interval $t_2$.

The first preset time interval $t_1$ may be determined based on a data packet loss rate during access request data packet sending or the like. If the value is too small and the data packet loss rate is high, a proper first preset time interval $t_1$ is selected based on a case. In an embodiment, the first preset time interval $t_1$ is set to 50 ms. The monitoring time is $T = t_1 * m$, and the monitoring time may be set based on an actual case. If the monitoring time is too short, it is possible that the first terminal device sends a response data packet to the second terminal device, but because of network congestion, monitoring is stopped before the response data packet is received. If the monitoring time is too long, connection establishment time is too long, and consequently time for P2P data transmission performed after connection establishment is occupied. In an optional embodiment, the monitoring time is set to 1 s.

Step 106: Within a $t_2*n_2 + t_1*n_1$ monitoring time period of the source port of the first terminal device, if the port-restricted NAT detects that the source port of the first terminal device receives a first access request data packet from the second terminal device, the first terminal device obtains address information in the first access request data packet, and sends a response data packet based on the obtained address information.

monitoring time that is set for the file descriptor used by the first terminal device is $t_2*n_2 + t_1*n_1$. Within the monitoring time, if the port-restricted NAT detects that the source port corresponding to the file descriptor receives the first access request data packet from the symmetric NAT of the second terminal device, the first terminal device unpacks the first access request data packet to obtain the address information in the first access request data packet, and the first terminal device sends the response data packet based on the address information.

Step 108: When detecting that a first port of the second terminal device receives the response data packet, the symmetric NAT stops monitoring of other source ports, where the first port corresponds to the obtained address information.

If a port corresponding to any file descriptor in the queue receives a response data packet of the first terminal device, address information corresponding to the file descriptor is recorded, monitoring of other source ports is stopped, and the queue is cleared.

According to the P2P connection establishment method in this embodiment, one file descriptor is used on a port-restricted NAT side, and m file descriptors are used on a symmetric NAT side. Therefore, a relatively high connection establishment success rate is provided by using a relatively small quantity of file descriptors, and file descriptor utilization can be improved due to occupation of a relatively small quantity of file descriptors, thereby saving a common resource, and implementing a same function by using as few file descriptors as possible.

If still no response data packet is received when preset monitoring time T of a source port recorded by an $(n_1)^{th}$ file descriptor ends, the step of sending, by the first terminal device, $n_2$ second access request data packets at a second preset time interval $t_2$ by using one file descriptor is performed again under a preset condition.

The preset condition may be that a new external network address is detected or network switching is detected. For example, if a network is switched from a mobile network to Wi-Fi or from Wi-Fi to a mobile network, a new connection is established, and steps 102 to 108 are performed.

Figure 2:
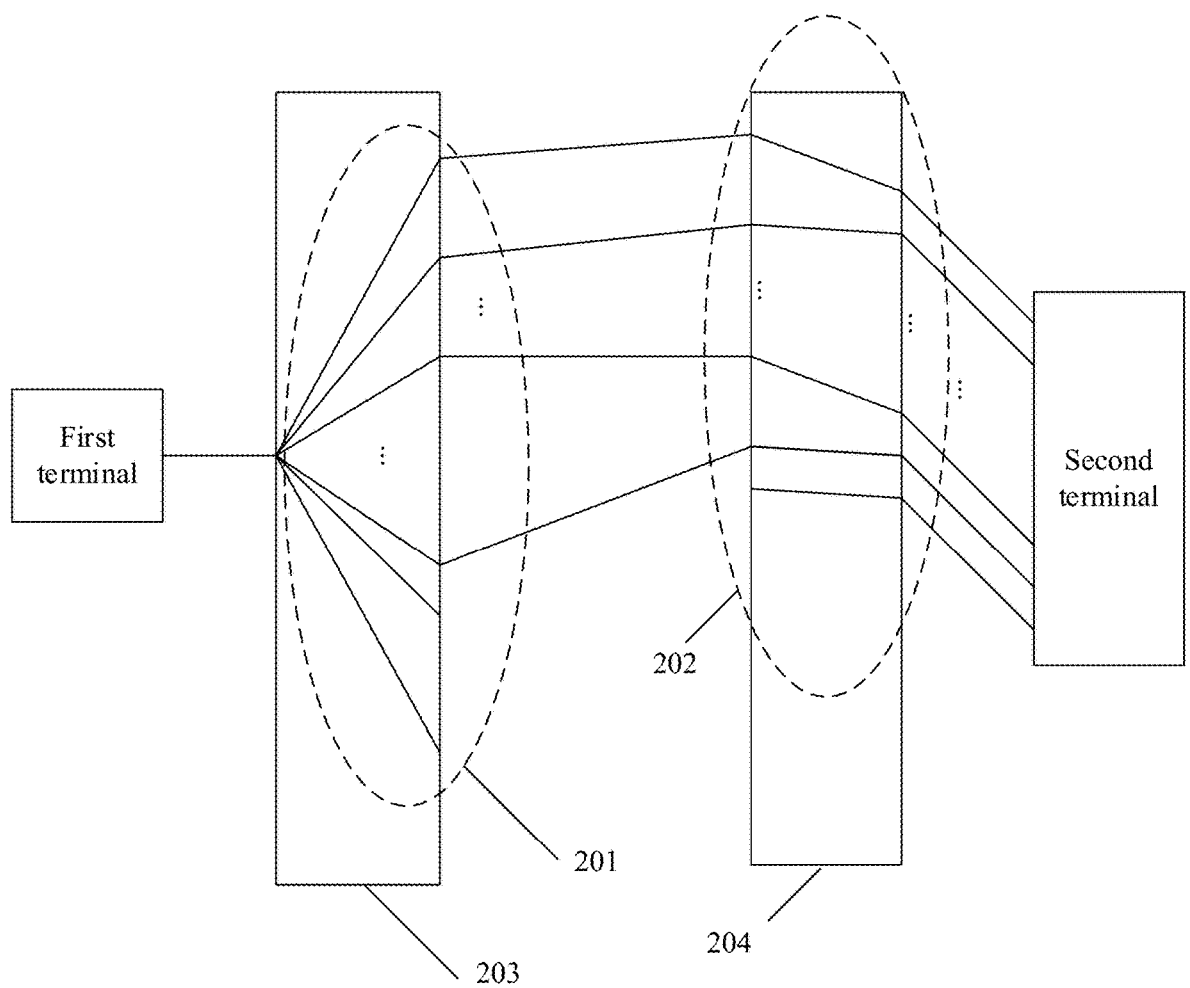
FIG. 2 is a schematic diagram of a structure of a P2P connection system according to an embodiment of this application.

As shown in FIG. 2, the first terminal device is in a port-restricted NAT router 203, also referred to as port-restricted NAT, and the second terminal device is in a symmetric NAT router 204, also referred to as symmetric NAT. When the first terminal device sends the $n_2$ second access request data packets, first mapping relationships between address information of the first terminal device and address information of the second terminal device are established. When the second terminal device sends the $n_1$ first access request data packets, second mapping relationships between address information of the second terminal device and address information of the first terminal device are established. The first mapping relationships are shown by 201 in FIG. 2, and the second mapping relationships are shown by 202 in FIG. 2. The detecting that the source port of the first terminal device receives a first access request data packet from the second terminal device may be implemented by using the following method:

comparing the first mapping relationships with the second mapping relationships, and if there are matching mapping relationships, detecting that the source port of the first terminal device receives the first access request data packet from the second terminal device.

When the $n_2$ second access request data packets are sent, $n_2$ first mapping relationships ($IP_1$, $Port_1$, $IP_2$, $Port_2$) are established. When the $n_1$ first access request data packets are sent, $n_1$ second mapping relationships ($IP_2$, $Port_2$, $IP_1$, $Port_1$) are established. The two mapping relationships match in $IP_1$, $IP_2$, and $Port_1$. If $Port_2$ in one of the second mapping relationships matches $Port_2$ in one of the first mapping relationships, it may be detected that the first terminal device receives a first access request data packet. For example, the first terminal device performs, by using a port $Port_1$, sending with a port $Port_2$, of the second terminal device, that is, $Port_2$ in a first mapping relationship is $Port_{2n}$. If the second terminal device performs, by using the port $Port_{2n}$, sending with the port $Port_1$ of the first terminal device, that is, $Port_2$ in a second mapping relationship is also $Port_{2n}$, the mapping relationships match, and the source port of the first terminal device successfully receives a first access request data packet.

After the first terminal device establishes a P2P connection to the second terminal device, the second terminal device sends, by using the first port, first to-be-transmitted data to the source port corresponding to the file descriptor of the first terminal device; and/or the first terminal device sends second to-be-transmitted data to the first port by using the source port corresponding to the file descriptor of the first terminal device, to start data transmission. For example, data is transmitted by using the foregoing $Port_{2n}$.

Figure 3:
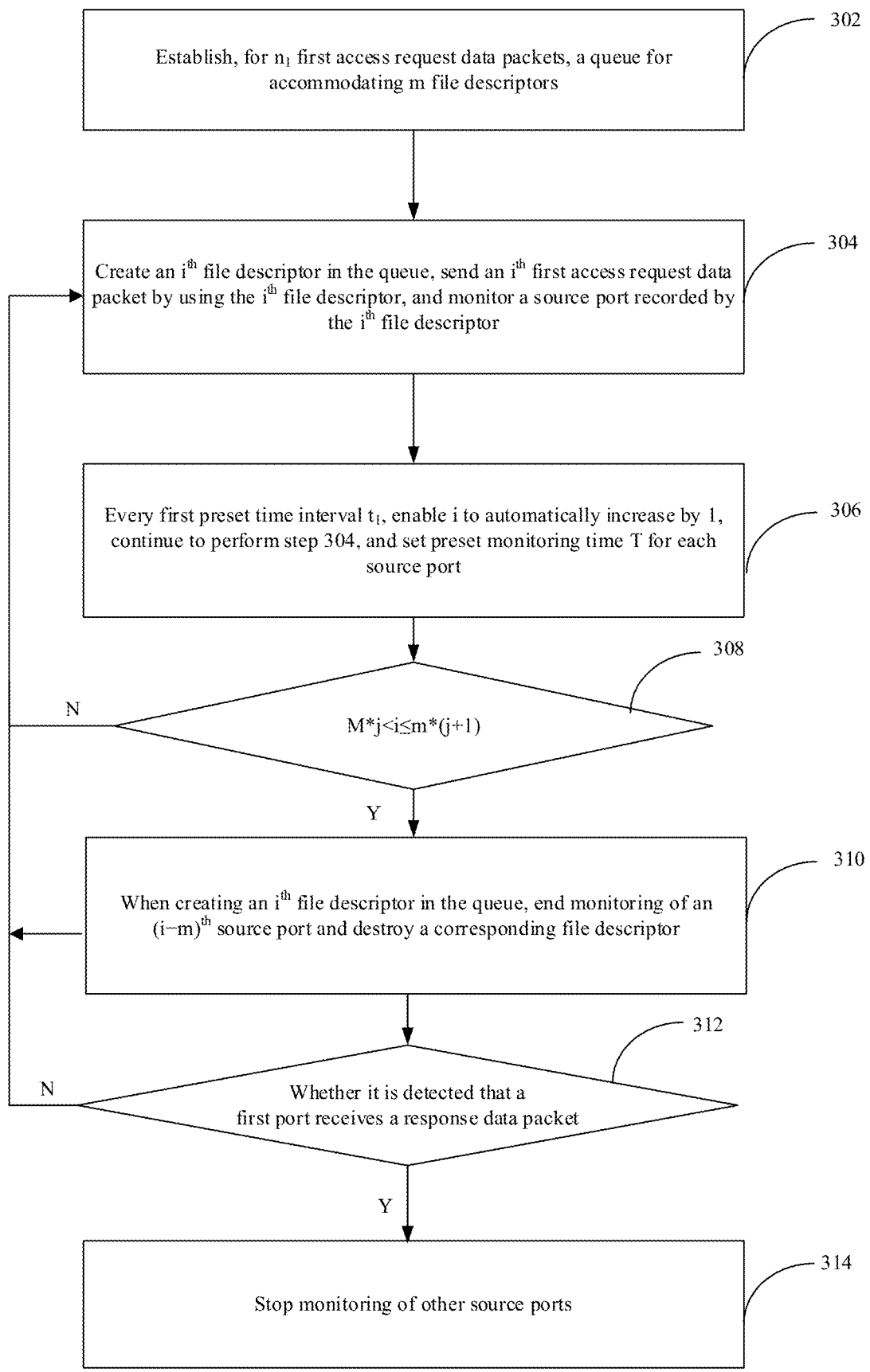
FIG. 3 is a processing flowchart of a data sending method performed by a second terminal device in symmetric NAT according to an embodiment of this application.

FIG. 3 is a processing flowchart of a data sending method performed by a second terminal device in symmetric NAT. The data sending method includes the following steps:

Step 302: Establish, for $n_1$ first access request data packets, a queue for accommodating m file descriptors, where $2 \leq m < n_1$.

Step 304: Create an $i^{th}$ file descriptor in the queue, send an $i^{th}$ first access request data packet by using the $i^{th}$ file descriptor, and monitor a source port recorded by the $i^{th}$ file descriptor, where the $i^{th}$ file descriptor has a same source port as the $i^{th}$ first access request data packet, and $1 \leq i \leq n_1$.

Step 306: Every first preset time interval $t_1$, enable i to automatically increase by 1, continue to perform step 304, and set preset monitoring time T for each source port, where each file descriptor records a different source port, and $T = t_1 * m$.

After the first preset time interval $t_1$ after the $i^{th}$ file descriptor is created, an $(i+1)^{th}$ file descriptor is created in the queue, an $(i+1)^{th}$ first access request data packet is sent by using the $(i+1)^{th}$ file descriptor, and a source port recorded by the $(i+1)^{th}$ file descriptor is monitored, where the $(i+1)^{th}$ file descriptor has a same source port as the $(i+1)^{th}$ first access request data packet; after the first preset time interval $t_1$ after the $(i+1)^{th}$ file descriptor is created, an $(i+2)^{th}$ file descriptor is created in the queue, an $(i+2)^{th}$ first access request data packet is sent by using the $(i+2)^{th}$ file descriptor, and a source port recorded by the $(i+2)^{th}$ file descriptor is monitored, where the (i+2)th file descriptor has a same source port as the $(i+2)^{th}$ first access request data packet; and so on, where i is enabled to automatically increase by 1, and after i automatically increases by 1 each time, a corresponding file descriptor is created and a first access request data packet is sent based on the file descriptor.

Step 308: Determine whether $m*j < i \leq m*(j+1)$ is met; and if yes, perform step 310; or if no, perform step 304.

Step 310: When creating an $i^{th}$ file descriptor in the queue, end monitoring of an $(i-m)^{th}$ source port and destroy a corresponding file descriptor, and continue to perform step 312.

Step 312: Determine whether it is detected that a first port receives a response data packet; and if yes, perform step 314; or if no, perform step 304.

Step 314: Stop monitoring of other source ports, where $j \geq 1$, and the first port is any source port in a monitored state.

According to the data sending method in this embodiment, the terminal device in the symmetric NAT uses the queue for accommodating m file descriptors, and sets proper monitoring time for each file descriptor, so that a relatively large quantity of data packets are sent on a terminal device side by using only m file descriptors. Therefore, a relatively high connection establishment success rate is provided by using a relatively small quantity of file descriptors, and file descriptor utilization can be improved due to occupation of a relatively small quantity of file descriptors, thereby saving a common resource, and implementing a same function by using as few file descriptors as possible.

Optionally, if still no response data packet is received when preset monitoring time T of a source port recorded by an $(n_1)^{th}$ file descriptor ends, the step of establishing, for $n_1$ first access request data packets, a queue for accommodating m file descriptors is performed again.

Optionally, the stopping monitoring of other source ports when it is detected that a first port receives a response data packet includes:

optionally, when detecting that the first port receives the response data packet, destroying file descriptors corresponding to the other source ports.

Optionally, before the establishing, for $n_1$ first access request data packets, a queue for accommodating m file descriptors, the data sending method further includes:

sending an information obtaining request to a traversal auxiliary server;

receiving address information and a NAT type of the terminal device that are sent by the traversal auxiliary server;

sending the received address information and NAT type to an access management server; and receiving address information and a NAT type of a to-be-accessed end that are fed back by the access management server.

Before the sending an $i^{th}$ first access request data packet by using the $i^{th}$ file descriptor, the data sending method further includes:

generating the $i^{th}$ first access request data packet based on the received address information of the to-be-accessed end and the source port corresponding to the $i^{th}$ file descriptor.

Figure 4:
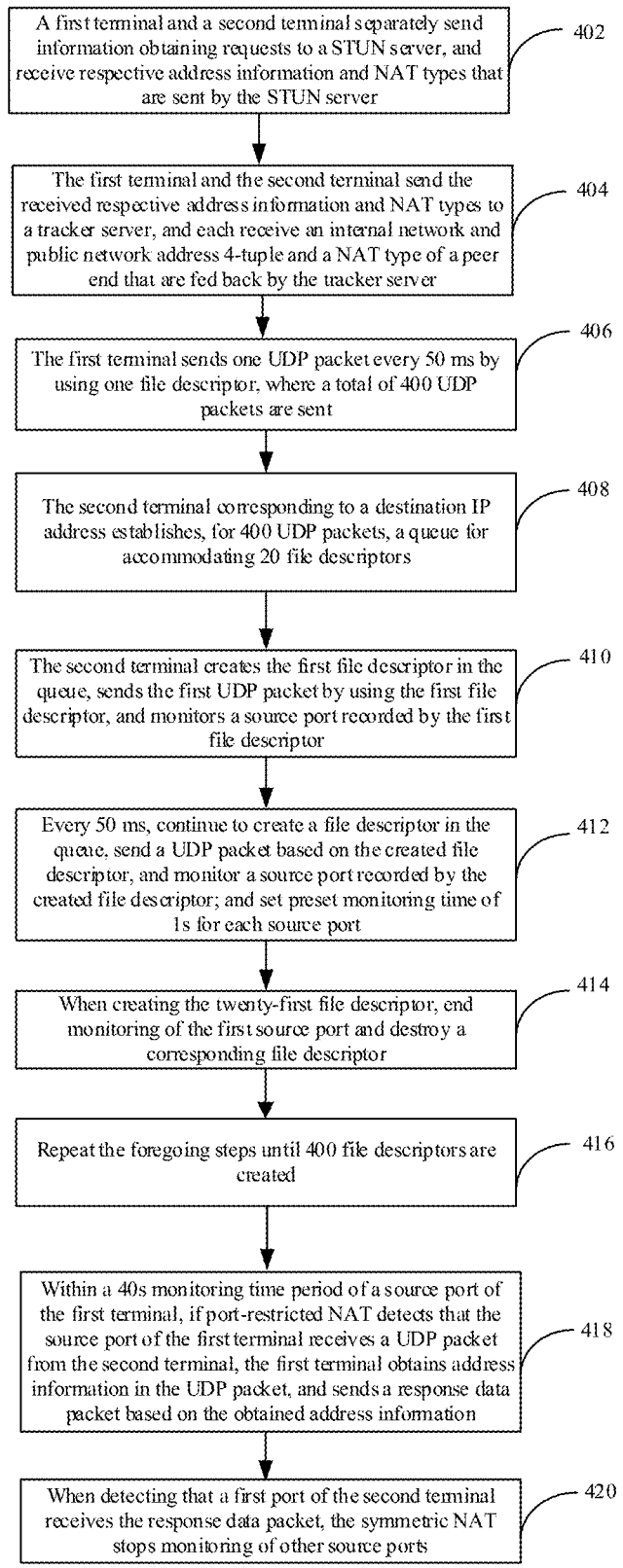
FIG. 4 is a processing flowchart of a P2P connection establishment method according to an embodiment of this application.

With reference to FIG. 4, a specific application of the P2P connection establishment method provided in this application is used as an example to further describe the P2P connection establishment method. FIG. 4 is a processing flowchart of a P2P connection establishment method according to an embodiment of this application. The P2P connection establishment method specifically includes the following steps:

Step 402: A first terminal device and a second terminal device separately send information obtaining requests to a STUN server, and receive respective address information and NAT types that are sent by the STUN server.

The first terminal device is in port-restricted NAT, and the second terminal device is in symmetric NAT. The first terminal device and the second terminal device separately obtain internal network and public network address 4-tuples and the NAT types of the first terminal device and the second terminal device by using the STUN server.

Step 404: The first terminal device and the second terminal device send the received respective address information and NAT types to a tracker server, and each receive an internal network and public network address 4-tuple and a NAT type of a peer end that are fed back by the tracker server.

The tracker server may send, to each terminal device based on a same request resource ID, node information for playing a same resource. The first terminal device and the second terminal device each obtain the internal network and public network address 4-tuple and the NAT type of the peer end.

Step 406: The first terminal device sends one UDP packet every 50 ms by using one file descriptor, where a total of 400 UDP packets are sent, and the 400 UDP packets have a same destination IP address and different destination ports.

Destination IP addresses in the 400 UDP packets are the same, and are all an external network IP address of the second terminal device. Destination ports of all the UDP packets are different.

Setting the destination ports in step 406 may be implemented by using the following method: setting an initial port of the second terminal device to $$\text{Port} = |rand(\ )|\% \frac{(65535 - 1024)}{n_2} + 1024,$$

and setting an interval between a destination port of each UDP packet and a destination port of a previous UDP packet to $$\frac{(65535 - 1024)}{n_2}.$$

Ports 0 to 1023 are ports of an inherent protocol, and therefore these ports are not allocated during automatic allocation, thereby improving a hole punching success rate. The destination port interval is set to the value, so that the ports can be spaced apart. Therefore, matching degrees between second terminal device mapping relationships and the destination ports are improved, thereby improving a P2P connection establishment success rate. Different initial ports are allocated, and there is a same distance between each following port and a previous port, to prevent mapping information that is left in the port-restricted NAT of the first terminal device when the first terminal device previously established a connection to the second terminal device from being overwritten when the first terminal device establishes a connection to a third terminal device or establishes connections to more other terminal devices, so that connections established between terminal devices are independent of each other, thereby effectively improving a connection establishment success rate.

Step 408: The second terminal device corresponding to the destination IP address establishes, for 400 UDP packets, a queue for accommodating 20 file descriptors.

Step 410: The second terminal device creates the first file descriptor in the queue, sends the first UDP packet by using the first file descriptor, and monitors a source port recorded by the first file descriptor, where the first file descriptor has a same source port as the first UDP packet.

Step 412: Every 50 ms, continue to create a file descriptor in the queue, send a UDP packet based on the created file descriptor, and monitor a source port recorded by the created file descriptor; and set preset monitoring time of 1 s for each source port, where each file descriptor records a different source port, and each file descriptor has a same source port as a UDP packet sent by using the file descriptor.

Step 414: When creating the twenty-first file descriptor, end monitoring of the first source port and destroy a corresponding file descriptor.

Step 416: Repeat the foregoing steps until 400 file descriptors are created.

Step 418: Within a 40s monitoring time period of a source port of the first terminal device, if the port-restricted NAT detects that the source port of the first terminal device receives a UDP packet from the second terminal device, the first terminal device obtains address information in the UDP packet, and sends a response data packet based on the obtained address information.

The monitoring time period of the source port of the first terminal device is set to 50 ms*400+50 ms*400=40 s. If a packet is received in the monitoring time period, address information in the UDP packet is obtained.

Step 420: When detecting that a first port of the second terminal device receives the response data packet, the symmetric NAT stops monitoring of other source ports, where the first port corresponds to the obtained address information.

If a port corresponding to any file descriptor in the queue receives a response data packet of the first terminal device, address information corresponding to the file descriptor is recorded, and other file descriptors are destroyed. Then, the second terminal device sends, by using the first port, first to-be-transmitted data to the source port corresponding to the file descriptor of the first terminal device; and/or the first terminal device sends second to-be-transmitted data to the first port by using the source port corresponding to the file descriptor of the first terminal device, to start data transmission.

According to the P2P connection establishment method in this embodiment, the second terminal device uses the queue for accommodating 20 file descriptors, and sets proper monitoring time of 1 s for each file descriptor, so that the 400 data packets are sent on a second terminal device side by using only 20 file descriptors. Therefore, a relatively high connection establishment success rate is provided by using a relatively small quantity of file descriptors, and file descriptor utilization can be improved due to occupation of a relatively small quantity of file descriptors, thereby saving a common resource, and implementing a same function by using as few file descriptors as possible.

Figure 5:
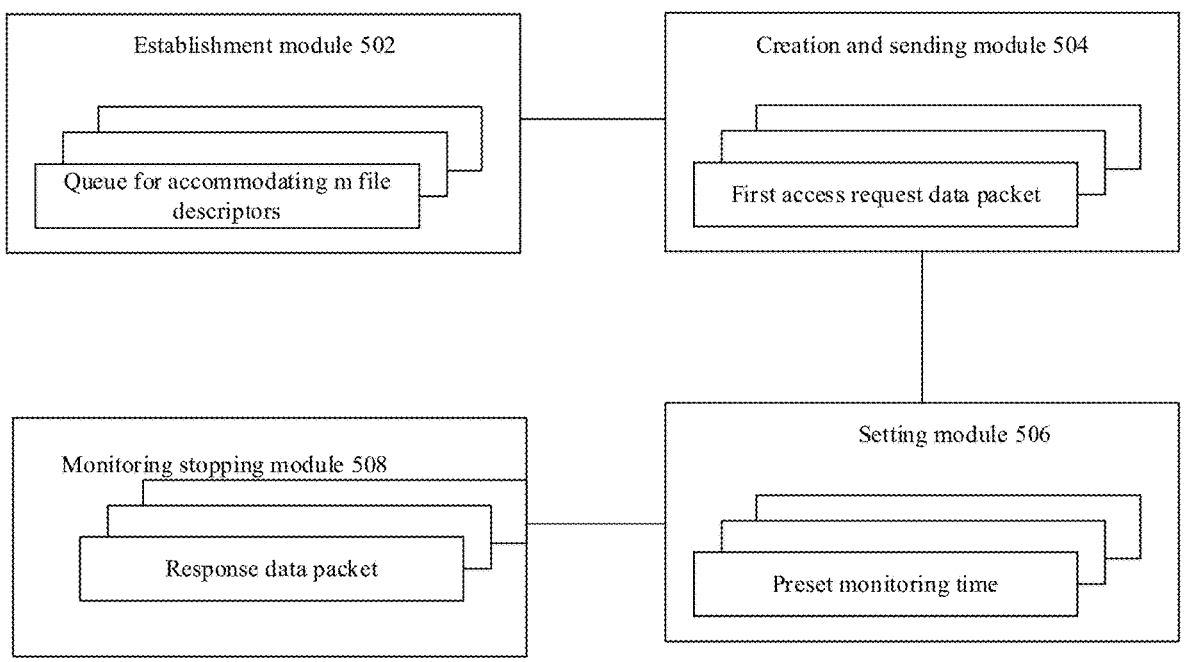
FIG. 5 is a schematic diagram of a structure of a data sending apparatus according to an embodiment of this application.

Corresponding to the foregoing method embodiment, this application further provides a data sending apparatus embodiment, applied to a terminal device in symmetric NAT. FIG. 5 is a schematic diagram of a structure of a data sending apparatus according to an embodiment of this application. As shown in FIG. 5, the apparatus includes:
an establishment module 502, configured to perform step S1: establishing, for $n_1$ first access request data packets, a queue for accommodating m file descriptors, where $2 \leq m \leq n_1$;
a creation and sending module 504, configured to perform step S2: creating an $i^{th}$ file descriptor in the queue, sending an $i^{th}$ first access request data packet by using the $i^{th}$ file descriptor, and monitoring a source port recorded by the $i^{th}$ file descriptor, where the $i^{th}$ file descriptor has a same source port as the $i^{th}$ first access request data packet, and $1 \leq i \leq n_1$;
a setting module 506, configured to perform step S3: every first preset time interval $t_1$, enabling i to automatically increase by 1, continuing to perform step S2, and setting preset monitoring time T for each source port, where each file descriptor records a different source port, and $T = t_1 * m$; and
a monitoring stopping module 508, configured to perform step S4: if $m*j < i \leq m*(j+1)$, when creating an $i^{th}$ file descriptor in the queue, ending monitoring of an $(i-m)^{th}$ source port and destroying a corresponding file descriptor, and stopping monitoring of other source ports when it is detected that a first port receives a response data packet, where $j \geq 1$, and the first port is any source port in a monitored state.

In an optional embodiment, the data sending apparatus further includes:
an execution module, configured to: if still no response data packet is received when preset monitoring time T of a source port recorded by an $(n_1)^{th}$ file descriptor ends, perform, again, the step of establishing, for $n_1$ first access request data packets, a queue for accommodating m file descriptors.

In an optional embodiment, the data sending apparatus further includes: a transmission module, configured to send first to-be-transmitted data and/or receive second to-be-transmitted data by using the first port.

In an optional embodiment, the monitoring stopping module is further configured to:
when detecting that the first port receives the response data packet, destroy file descriptors corresponding to the other source ports.

In an optional embodiment, the data sending apparatus further includes:
a first sending module, configured to send an information obtaining request to a traversal auxiliary server;
a first receiving module, configured to receive address information and a NAT type of the terminal device that are sent by the traversal auxiliary server;
a second sending module, configured to send the received address information and NAT type to an access management server; and
a second receiving module, configured to receive address information and a NAT type of a to-be-accessed end that are fed back by the access management server.

In an optional embodiment, the data sending apparatus further includes:
a generation module, configured to generate the $i^{th}$ first access request data packet based on the received address information of the to-be-accessed end and the source port corresponding to the $i^{th}$ file descriptor.

According to the data sending apparatus in this embodiment, a relatively high connection establishment success rate is provided by using a relatively small quantity of file descriptors, and file descriptor utilization can be improved due to occupation of a relatively small quantity of file descriptors, thereby saving a common resource, and implementing a same function by using as few file descriptors as possible.

The schematic solution of the data sending apparatus in this embodiment has been described previously. It should be noted that the technical solutions of the data sending apparatus are of the same concept as the technical solutions of the foregoing data sending method. For details that are not described in detail in the technical solutions of the data sending apparatus, refer to the descriptions of the technical solutions of the foregoing data sending method.

This application further provides a P2P connection establishment system. As shown in FIG. 2, the P2P connection establishment system includes port-restricted NAT, a first terminal device in the port-restricted NAT, symmetric NAT, and a second terminal device in the symmetric NAT. The first terminal device is configured to send $n_2$ second access request data packets at a second preset time interval $t_2$ by using one file descriptor, where the $n_2$ second access request data packets have a same destination IP address and different destination ports.

The second terminal device corresponds to the destination IP address, and the second terminal device is configured to perform the following steps:
S1: establishing, for $n_1$ first access request data packets, a queue for accommodating m file descriptors, where $2 \leq m < n_1$;
S2: creating an $i^{th}$ file descriptor in the queue, sending an $i^{th}$ first access request data packet by using the $i^{th}$ file descriptor, and monitoring a source port recorded by the $i^{th}$ file descriptor, where the $i^{th}$ file descriptor has a same source port as the $i^{th}$ first access request data packet, and $1 \leq i \leq n_1$;
S3: every first preset time interval $t_1$, enabling i to automatically increase by 1, continuing to perform step S2, and setting preset monitoring time T for each source port, where each file descriptor records a different source port, and $T = t_1 * m$; and
S4: if $m*j < i \leq m*(j+1)$, when creating an $i^{th}$ file descriptor in the queue, ending monitoring of an $(i-m)^{th}$ source port and destroying a corresponding file descriptor.

The first terminal device is configured to: within a $t_2*n_2 + t_1*n_1$ monitoring time period of a source port of the first terminal device, if the port-restricted NAT detects that the source port of the first terminal device receives a first access request data packet from the second terminal device, obtain address information in the first access request data packet, and send a response data packet based on the obtained address information.

The symmetric NAT is configured to: when detecting that a first port of the second terminal device receives the response data packet, stop monitoring of other source ports, where the first port corresponds to the obtained address information.

Figure 6:
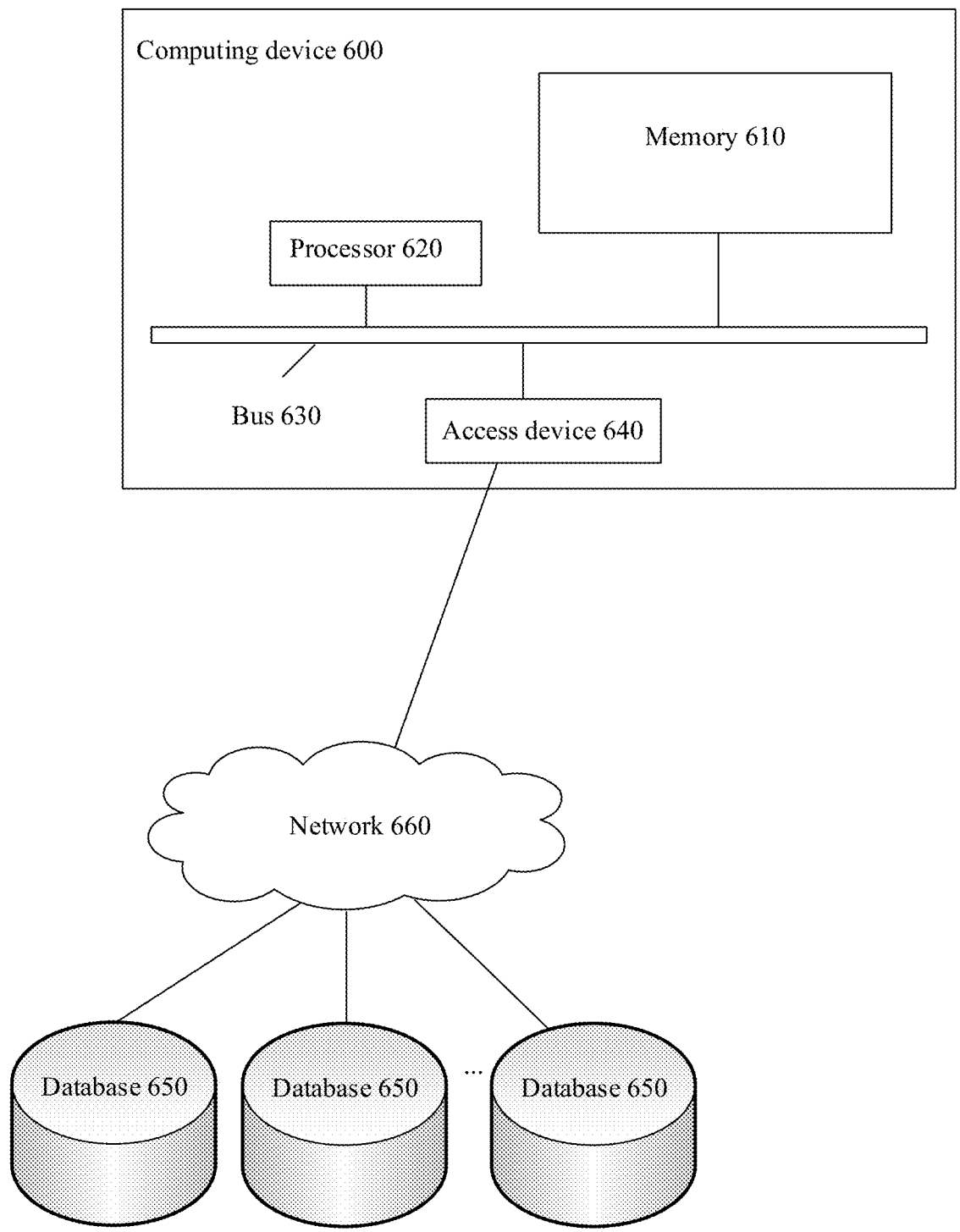
FIG. 6 is a block diagram of a structure of a computing device according to an embodiment of this application.

FIG. 6 is a block diagram of a structure of a computing device 600 used in embodiments of this application, e.g., the first terminal device and the second terminal device. Components of the computing device 600 include but are not limited to a memory 610 and a processor 620. The processor 620 is connected to the memory 610 by using a bus 630, and a database 650 is configured to store data.

The computing device 600 further includes an access device 640. The access device 640 enables the computing device 600 to perform communication by using one or more networks 660. Examples of these networks include a public switched telephone network (PSTN), a local area network (LAN), a wide area network (WAN), a private area network (PAN), or a combination of communication networks such as the Internet. The access device 640 may include one or more of any-type wired or wireless network interfaces (for example, a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 600 and other components not shown in FIG. 6 may also be connected to each other, for example, by using the bus. It should be understood that the block diagram of the structure of the computing device shown in FIG. 6 is merely used as an example instead of a limitation on the scope of this application. A person skilled in the art can add or replace other components as required.

The computing device 600 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a stationary computing device such as a desktop computer or a PC. The computing device 600 may be alternatively a mobile or stationary server.

The processor 620 implements the steps of the data sending method when executing instructions.

The schematic solution of the computing device in this embodiment has been described previously. It should be noted that the technical solutions of the computing device are of the same concept as the technical solutions of the foregoing data sending method. For details that are not described in detail in the technical solutions of the computing device, refer to the descriptions of the technical solutions of the foregoing data sending method.

An embodiment of this application further provides a computer-readable storage medium, storing computer instructions, where the steps of the data sending method described above are implemented when the instructions are executed by a processor.

The schematic solution of the computer-readable storage medium in this embodiment has been described previously. It should be noted that the technical solutions of the storage medium are of the same concept as the technical solutions of the foregoing data sending method. For details that are not described in detail in the technical solutions of the storage medium, refer to the descriptions of the technical solutions of the foregoing data sending method.

The foregoing describes specific embodiments of this application. Other embodiments fall within the scope of the appended claims. In some cases, the actions or steps described in the claims can be performed in orders different from the orders in the embodiments and the desired results can still be achieved. In addition, the processes described in the accompanying drawings do not necessarily require the shown specific orders or sequences to achieve the desired results. In some implementations, multi-tasking and parallel processing are also possible or may be advantageous.

The computer instructions include computer program code. The computer program code may be in a source code form, an object code form, an executable file form, an intermediate form, or the like. The computer-readable medium may include any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like. It should be noted that appropriate addition or deletion can be performed on content included in the computer-readable medium according to requirements of legislation and patent practice in a jurisdiction, for example, in some jurisdictions, according to legislation and patent practice, the computer-readable medium includes neither an electrical carrier signal nor a telecommunication signal.

It should be noted that, for ease of description, the foregoing method embodiments are described as a combination of a series of actions. However, a person skilled in the art should be aware that this application is not limited to the described action order, because some steps may be performed in another order or simultaneously according to this application. In addition, a person skilled in the art should also be aware that the embodiments described in this specification are all example embodiments, and involved actions and modules are not necessarily mandatory to this application.

In the foregoing embodiments, the descriptions of the embodiments have respective focuses. For a part that is not described in detail in an embodiment, refer to related descriptions in other embodiments.

The example embodiments of this application disclosed above are merely intended to help describe this application. The optional embodiments neither describe all the details in detail, nor limit the present disclosure only to the specific implementations. Clearly, many modifications and variations can be made based on the content of this application. These embodiments are selected and specifically described in this application to better explain the principle and practical application of this application, so that a person skilled in the art can well understand and use this application. This application is only subject to the claims and a full scope and equivalents thereof.

What is claimed is:

1. A method of sending data, applied to a terminal device associated with symmetric network address translation (NAT), the method comprising:
   establishing a queue for accommodating m file descriptors for generating $n_1$ first access request data packets to be sent from the terminal device, wherein $2 \leq m < n_1$;
   creating an $i^{th}$ file descriptor in the queue, generating and sending an $i^{th}$ first access request data packet by using the $i^{th}$ file descriptor, and monitoring a source port recorded by the $i^{th}$ file descriptor, wherein the $i^{th}$ file descriptor corresponds to a same source port as the $i^{th}$ first access request data packet, and $1 \leq i \leq n_1$;
   at every first preset time interval $t_1$, enabling i to automatically increase by 1, continuing to perform operations of creating an $(i+1)^{th}$ file descriptor in the queue, generating and sending an $(i+1)^{th}$ first access request data packet by using the $(i+1)^{th}$ file descriptor, and monitoring a source port recorded by the $(i+1)^{th}$ file descriptor, and setting a preset monitoring time T for each source port, wherein each file descriptor records a different source port, and $T = t_1 * m$;
   ending monitoring of an $(i-m)^{th}$ source port and destroying a corresponding file descriptor while creating a file descriptor in the queue when $m*j < i \leq m*(j+1)$, wherein $j \geq 1$; and
   stopping monitoring other source ports in response to detecting that a first port of the terminal device receives a response data packet, and wherein the first port is any source port in a monitored state.

2. The method according to claim 1, further comprising:
   in response to determining that no response data packet is received when a preset monitoring time T of a source port recorded by an $(n_1)^{th}$ file descriptor ends, iterating the operation of establishing a queue for accommodating m file descriptors for $n_1$ first access request data packets to be sent from the terminal device.

3. The method according to claim 1, further comprising:
   sending first to-be-transmitted data and/or receiving second to-be-transmitted data by using the first port of the terminal device.

4. The method according to claim 1, wherein the stopping monitoring other source ports in response to detecting that a first port of the terminal device receives a response data packet comprises:
   in response to detecting that the first port receives the response data packet, destroying file descriptors corresponding to the other source ports.

5. The method according to claim 1, wherein before the establishing a queue for accommodating m file descriptors, the method further comprising:
   sending a request for obtaining information to a traversal auxiliary server;
   receiving address information and a NAT type of the terminal device that are sent by the traversal auxiliary server;
   sending the received address information and the NAT type to an access management server; and
   receiving address information and a NAT type of a to-be-accessed end that are fed back by the access management server.

6. The method according to claim 5, wherein before the sending an $i^{th}$ first access request data packet by using the $i^{th}$ file descriptor, the method further comprising:
   generating the $i^{th}$ first access request data packet based on the received address information of the to-be-accessed end and the source port corresponding to the $i^{th}$ file descriptor.

7. A method of establishing a peer to peer (P2P) connection, comprising:
   sending, by a first terminal device, $n_2$ second access request data packets at a second preset time interval $t_2$ by using one file descriptor, wherein the first terminal device is associated with port-restricted network address translation (NAT), and wherein the $n_2$ second access request data packets comprises a same destination IP address and different destination ports, wherein a second terminal device that is associated with symmetric NAT and that corresponds to the destination IP address comprised in the $n_2$ second access request data packets, wherein the second terminal device is configured to performs operations comprising:
   S1: establishing a queue for accommodating m file descriptors for $n_1$ first access request data packets to be sent from the second terminal device, wherein $2 \leq m < n_1$;
   S2: creating an $i^{th}$ file descriptor in the queue, sending an $i^{th}$ first access request data packet by using the $i^{th}$ file descriptor, and monitoring a source port recorded by the $i^{th}$ file descriptor, wherein the $i^{th}$ file descriptor has a same source port as the $i^{th}$ first access request data packet, and $1 \leq i \leq n_1$,
   S3: at every first preset time interval $t_1$, enabling i to automatically increase by 1, continuing to perform operation S2, and setting a preset monitoring time T for each source port, wherein each file descriptor records a different source port, and $T = t_1 * m$, and
   S4: ending monitoring of an $(i-m)^{th}$ source port and destroying a corresponding file descriptor while creating an $i^{th}$ file descriptor in the queue when $m*j < i \leq m*(j+1)$;
   within a $t_2 * n_2 + t_1 * n_1$ monitoring time period of a source port of the first terminal device, in response to detecting that the source port of the first terminal device receives a first access request data packet from the second terminal device by the port-restricted NAT, obtaining, by the first terminal device, address information in the first access request data packet, and sending a response data packet based on the obtained address information; and
   in response to detecting that a first port of the second terminal device receives the response data packet, stopping, by the symmetric NAT, monitoring other source ports, wherein the first port corresponds to the obtained address information.

8. The method according to claim 7, further comprising:
   in response to determining that no response data packet is received when a preset monitoring time T of a source port recorded by an $(n_1)^{th}$ file descriptor ends, iterating, under a preset condition, the operation of sending, by the first terminal device, $n_2$ second access request data packets at a second preset time interval $t_2$ by using one file descriptor.

9. The method according to claim 7, wherein before the sending, by the first terminal device, $n_2$ second access request data packets at a second preset time interval $t_2$ by using one file descriptor, the method further comprising:
   sending, by the first terminal device and the second terminal device, information obtaining requests to a traversal auxiliary server, respectively;

receiving, by the first terminal device and the second terminal device, respective address information and NAT types that are sent by the traversal auxiliary server;

sending, by the first terminal device and the second terminal device, the received respective address information and NAT types to an access management server, respectively; and receiving, by the first terminal device, address information and a NAT type of the second terminal device that are fed back by the access management server, and receiving, by the second terminal device, address information and a NAT type of the first terminal device that are fed back by the access management server.

10. The method according to claim 9, wherein before the sending, by the first terminal device, $n_2$ second access request data packets at a second preset time interval $t_2$ by using one file descriptor, the method further comprising:

setting an initial port of the second terminal device to a random number, and setting destination ports for the $n_2$ second access request data packets, wherein there is a same interval between destination port numbers of any two consecutively sent second access request data packets; and generating the second access request data packets based on an IP address in the received address information of the second terminal device, the set destination ports, and a source port corresponding to the file descriptor.

11. The method according to claim 10, wherein the setting an initial port of the second terminal device to a random number, and setting destination ports for the $n_2$ second access request data packets comprises:

setting the initial port of the second terminal device to a sum of a random number related to $n_2$ and a preset value; and setting an interval between a destination port of each second access request data packet and a destination port of a previous second access request data packet to a fixed value related to the preset value.

12. The method according to claim 7, wherein when the first terminal device sends the $n_2$ second access request data packets, first mapping relationships between address information of the first terminal device and address information of the second terminal device are established;

wherein when the second terminal device sends the $n_1$ first access request data packets, second mapping relationships between address information of the second terminal device and address information of the first terminal device are established; and wherein the detecting that the source port of the first terminal device receives a first access request data packet from the second terminal device comprises:

detecting that the source port of the first terminal device receives the first access request data packet from the second terminal device in response to determining that there is a match based on comparing the first mapping relationships with the second mapping relationships.

13. The method according to claim 7, further comprising:

sending, by the second terminal device using the first port, first to-be-transmitted data to a source port corresponding to the file descriptor of the first terminal device; and/or sending, by the first terminal device, second to-be-transmitted data to the first port by using the source port corresponding to the file descriptor of the first terminal device.

14. The method according to claim 7, wherein $n_1=n_2$ and $t_1=t_2$.

15. The method according to claim 7, wherein the first access request data packets and the second access request data packets comprise UDP packets.

16. A system for establishing a peer to peer (P2P) connection, comprising port-restricted network address translation (NAT), a first terminal device associated with the port-restricted NAT, symmetric NAT, and a second terminal device associated with the symmetric NAT, wherein the first terminal device is configured to send $n_2$ second access request data packets at a second preset time interval $t_2$ by using one file descriptor, wherein the $n_2$ second access request data packets comprise a same destination IP address and different destination ports;

wherein the second terminal device corresponds to the destination IP address comprised in the n2 second access request data packets, and the second terminal device is configured to perform operations comprising:

S1: establishing a queue for accommodating m file descriptors for $n_1$ first access request data packets to be sent from the second terminal device, wherein $2 \leq m < n_1$, S2: creating an $i^{th}$ file descriptor in the queue, sending an $i^{th}$ first access request data packet by using the $i^{th}$ file descriptor, and monitoring a source port recorded by the $i^{th}$ file descriptor, wherein the $i^{th}$ file descriptor has a same source port as the $i^{th}$ first access request data packet, and $1 \leq i \leq n_1$, S3: at every first preset time interval $t_1$, enabling i to automatically increase by 1, continuing to perform operation S2, and setting a preset monitoring time T for each source port, wherein each file descriptor records a different source port, and $T=t_1*m$, and S4: ending monitoring of an $(i-m)^{th}$ source port and destroying a corresponding file descriptor for creating the $i^{th}$ file descriptor in the queue when $m*j < i \leq m*(j+1)$;

wherein the first terminal device is further configured to: within a $t_2*n_2+t_1*n_1$ monitoring time period of a source port of the first terminal device, in response to detecting that the source port of the first terminal device receives a first access request data packet from the second terminal device by the port-restricted NAT, obtain address information in the first access request data packet, and send a response data packet based on the obtained address information; and wherein the symmetric NAT is configured to: when detecting that a first port of the second terminal device receives the response data packet, stop monitoring other source ports, wherein the first port of the second terminal device corresponds to the obtained address information.

17. A computing device, comprising a memory, a processor, and computer instructions that are stored in the memory and executable by the processor, wherein the computer instructions upon execution by the processor cause the processor to perform operations comprising:

establishing a queue for accommodating m file descriptors for generating $n_1$ first access request data packets to be sent from the computing device, wherein $2 \leq m < n_1$, wherein the computing device is associated with symmetric network address translation (NAT);

creating an $i^{th}$ file descriptor in the queue, generating and sending an $i^{th}$ first access request data packet by using the $i^{th}$ file descriptor, and monitoring a source port recorded by the $i^{th}$ file descriptor, wherein the $i^{th}$ file descriptor corresponds to a same source port as the $i^{th}$ first access request data packet, and $1 \leq i \leq n_1$;

at every first preset time interval $t_1$, enabling i to automatically increase by 1, continuing to perform operations of creating an $(i+1)^{th}$ file descriptor in the queue, generating and sending an $(i+1)^{th}$ first access request data packet by using the $(i+1)^{th}$ file descriptor, and monitoring a source port recorded by the $(i+1)^{th}$ file descriptor, and setting a preset monitoring time T for each source port, wherein each file descriptor records a different source port, and $T=t_1*m$, ending monitoring of an $(i-m)^{th}$ source port and destroying a corresponding file descriptor while creating an $i^{th}$ file descriptor in the queue when $m*j<i \leq m*(j+1)$, wherein $j \geq 1$, stopping monitoring other source ports in response to detecting that a first port of the computing device receives a response data packet, and wherein the first port is any source port in a monitored state.

18. The computing device according to claim 17, the operations further comprising:

in response to determining that no response data packet is received when a preset monitoring time T of a source port recorded by an $(n_1)^{th}$ file descriptor ends, iterating the operations of establishing a queue for accommodating m file descriptors, sending first access request data packets by using the file descriptors, and monitoring source ports recorded by the file descriptors.

19. The computing device according to claim 17, wherein the stopping monitoring other source ports in response to detecting that a first port of the computing device receives a response data packet further comprises:

in response to detecting that the first port receives the response data packet, destroying file descriptors corresponding to the other source ports.

20. The computing device according to claim 17, the operations further comprising:

receiving address information and a NAT type of a to-be-accessed end that are fed back by an access management server; and generating the $i^{th}$ first access request data packet based on the received address information of the to-be-accessed end and the source port corresponding to the $i^{th}$ file descriptor.

\* \* \* \* \*